US010824958B2

(12) United States Patent
Ramage et al.

(10) Patent No.: US 10,824,958 B2
(45) Date of Patent: Nov. 3, 2020

(54) LOCALIZED LEARNING FROM A GLOBAL MODEL

(71) Applicant: Google LLC, Mountain View, CA (US)

(72) Inventors: Daniel Ramage, Seattle, WA (US); Jeremy Gillmor Kahn, Seattle, WA (US)

(73) Assignee: Google LLC, Mountain View, CA (US)

( * ) Notice: Subject to any disclaimer, the term of this patent is extended or adjusted under 35 U.S.C. 154(b) by 404 days.

(21) Appl. No.: 14/468,710

(22) Filed: Aug. 26, 2014

(65) Prior Publication Data

US 2016/0063393 A1 Mar. 3, 2016

(51) Int. Cl.
*G06N 20/00* (2019.01)
*H04L 29/06* (2006.01)

(52) U.S. Cl.
CPC .............. *G06N 20/00* (2019.01); *H04L 67/42* (2013.01)

(58) Field of Classification Search
CPC ............................... G06N 99/005; H04L 67/42
USPC .......................................................... 706/12
See application file for complete search history.

(56) References Cited

U.S. PATENT DOCUMENTS

| | | | |
|---|---|---|---|
| 6,778,995 B1 * | 8/2004 | Gallivan | G06F 16/287 707/739 |
| 8,639,639 B2 | 1/2014 | Jamil et al. | |
| 8,762,299 B1 | 6/2014 | Breckenridge et al. | |
| 8,762,733 B2 | 6/2014 | Derchak | |
| 2006/0242424 A1 * | 10/2006 | Kitchens | G06F 21/316 713/183 |
| 2007/0143104 A1 * | 6/2007 | Deng | G10L 15/14 704/209 |
| 2007/0220126 A1 * | 9/2007 | Raghunathan | G06Q 10/087 709/223 |

(Continued)

FOREIGN PATENT DOCUMENTS

| | | |
|---|---|---|
| CN | 1578968 | 2/2005 |
| CN | 101776862 A | 7/2010 |

(Continued)

OTHER PUBLICATIONS

Hastie et al., "Overview of Suprvised Learning", The Elements of Statistical Learning, 2009, Springer.*

(Continued)

*Primary Examiner* — Robert A Cassity
*Assistant Examiner* — Tsu-Chang Lee
(74) *Attorney, Agent, or Firm* — Fish & Richardson P.C.

(57) ABSTRACT

Methods, systems, and apparatus, including computer programs encoded on a computer storage medium, for obtaining a global model for a particular activity, the global model derived based on input data representing multiple observations associated with the particular activity performed by a collection of users; determining, using the global model, expected data representing an expected observation associated with the particular activity performed by a particular user; receiving, by a computing device operated by the particular user, particular data representing an actual observation associated with the particular activity performed by the particular user; determining, by the computing device and using (i) the expected data and (ii) the particular data, residual data of the particular user; and deriving a local model of the particular user based on the residual data.

16 Claims, 6 Drawing Sheets

(56) References Cited

U.S. PATENT DOCUMENTS

| | | | |
|---|---|---|---|
| 2009/0043547 A1* | 2/2009 | Kirby | G06F 17/175 703/2 |
| 2010/0076968 A1 | 3/2010 | Boyns et al. | |
| 2010/0274556 A1* | 10/2010 | Sato | G10L 19/038 704/201 |
| 2011/0119108 A1 | 5/2011 | Black et al. | |
| 2011/0320767 A1 | 12/2011 | Eren et al. | |
| 2012/0023043 A1 | 1/2012 | Cetin et al. | |
| 2012/0068820 A1 | 3/2012 | Mollicone | |
| 2013/0103764 A1* | 4/2013 | Verkasalo | G06F 17/30241 709/204 |
| 2013/0144819 A1 | 6/2013 | Lin et al. | |
| 2013/0191908 A1 | 7/2013 | Klein | |
| 2013/0254152 A1 | 9/2013 | Zhang et al. | |
| 2014/0006592 A1* | 1/2014 | Soshin | G06Q 10/10 709/224 |
| 2014/0223462 A1* | 8/2014 | Aimone | H04N 21/42201 725/10 |
| 2016/0171377 A1* | 6/2016 | Caritu | G06N 99/005 706/14 |

FOREIGN PATENT DOCUMENTS

| | | |
|---|---|---|
| CN | 102298569 | 12/2011 |
| JP | 2005-135287 | 5/2005 |
| JP | 2011-34402 | 2/2011 |
| JP | 2015-153428 | 8/2015 |
| KR | 20110070516 A | 6/2011 |
| WO | WO2012151680 A1 | 11/2012 |

OTHER PUBLICATIONS

Jones, "How Little Sleep Can You Get Away With?" Apr. 15, 2011, Retrieved from the Internet: URL:http://www.nytimes.com/2011/04/17/magazine/mag-17Sleep-t.html. [retrieved on Nov. 19, 2015], 4 pages.

Rudder, "How Your Race Affects the Messages You Get," OkTrends, Oct. 5, 2009, Retrieved from the Internet: URL:http://blog.okcupid.com/index.php/your-race-affects-whether-people-write-you-back/, [retrieved on Nov. 19, 2015], 16 pages.

International Search Report and Written Opinion in International Application No. PCT/US2015/045346, dated Dec. 3, 2015, 16 pages.

Derawi, Mohammad O. et al., "Unobtrusive User-Authentication on Mobile Phones Using Biometric Gait Recognition", Sixth International Conference on Intelligent Information Hiding and Multimedia Signal Processing, 2010, 5 pages.

Gunawardana, Asela et al., "Discriminative Speaker Adaptation with Conditional Maximum Likelihood Linear Regression", EUROSPEECH 2001 Scandinavia, 7th European Conference on Speech Communication and Technology, 2nd INTERSPEECH Event, Aalborg, Denmark, Sep. 3-7, 2001, 4 pages.

Liao, Hank, "Speaker Adaptation of Context Dependent Deep Neural Networks", International Conference of Acoustics, Speech, and Signal Processing, 2013, 5 pages.

Scheffer, Nicolas et al., "The SRI INST 2010 Speaker Recognition Evaluation System", IEEE International Conference on Acoustics, Speech and Signal Processing, 2011, 4 pages.

Office Action issued in Japanese Application No. 2016-575656, dated Feb. 5, 2018, 6 pages (with English Translation).

Office action issued in Korean Application No. 10-2016-7036311, dated Aug. 17, 2018, 11 pages (with English Translation).

Yao et al. "Gesture recognition portfolios for personalization," IEEE Conference on Computer Vision and Pattern Recognition, Jun. 2014, 8 pages.

KR Notice of Allowance issued in Korean Application No. 10-2016-7036311, dated Mar. 21, 2019, 4 pages.

IN Office Action in Indian Application No. 201647043999, dated Dec. 16, 2019, 5 pages.

Office Action issued in Chinese Application No. 201580033188.2, dated Jun. 21, 2018, 16 pages (with English translation).

* cited by examiner

LOCALIZED LEARNING FROM A GLOBAL MODEL

BACKGROUND

This specification relates to evaluating a global model to determine user-specific characteristics.

A global model is typically generated to predict characteristics associated with an activity. A typical global model is generated by training a model using data collected from a collection of users.

SUMMARY

According to one innovative aspect of the subject matter described in this specification, a global model for an activity or a behavior may be trained by a server system using population-level data collected from a collection of users. The global model may be distributed to a user device. The global model may be evaluated locally on the user device to predict characteristics associated with the activity or the behavior for a user of the user device. The predicted characteristics may be compared with observed user-specific characteristics to generate a difference between local observations and the prediction of those observations. The difference may represent the user's individual signature, and may be used to train a user-specific model.

In general, one innovative aspect of the subject matter described in this specification can be embodied in methods that include the actions of obtaining a global model for a particular activity, the global model derived based on input data representing multiple observations associated with the particular activity performed by a collection of users; determining, using the global model, expected data representing an expected observation associated with the particular activity performed by a particular user; receiving, by a computing device operated by the particular user, particular data representing an actual observation associated with the particular activity performed by the particular user; determining, by the computing device and using (i) the expected data and (ii) the particular data, residual data of the particular user; and deriving a local model of the particular user based on the residual data.

These and other implementations can each optionally include one or more of the following features. Determining the residual data using (i) the expected data and (ii) the particular data may include determining the residual data based on a difference between the expected data and the particular data. The actions may include determining, using the local model, particular expected data representing an expected observation associated with the particular activity performed by the particular user, where the particular expected data determined by the local model substantially matches the particular data.

The local model may be derived by the computing device. The actions may include transmitting, from the computing device to one or more remote computers, the local model of the particular user as a representation of the particular user.

Deriving the local model of the particular user may include transmitting, from the computing device to one or more remote computers, the residual data, and deriving the local model by the one or more remote computers. The global model may include a first vector space constructed by first multiple principal axes, and the local model may include a second vector space constructed by second multiple principal axes that are different from the first multiple principal axes.

The actions may include obtaining a second global model for a second activity that is different from the particular activity, the second global model derived based on second input data representing multiple observations associated with the second activity performed by a collection of users; determining, using the second global model, second expected data representing an expected observation associated with the second activity performed by the particular user; receiving, by the computing device operated by the particular user, second particular data representing an actual observation associated with the second activity performed by the particular user; and determining, by the computing device and using (i) the second expected data and (ii) the second particular data, second residual data of the particular user.

Deriving the local model of the particular user may include deriving the local model of the particular user based at least on (i) the residual data and (ii) the second residual data.

Advantageous implementations may include one or more of the following features. The difference between local observations and the expected observations may be determined locally on the user device, and therefore may protect user privacy. The user-specific characteristics or the difference between local observations and the expected observations may be subsequently used to authenticate the user's identity. A more accurate local model for the user may be trained using the user-specific characteristics or the difference. The local model may be transmitted to the remote server to represent the user without disclosing actual observations of the user to the remote server, and therefore may further protect user privacy. By collecting local models trained on multiple client devices, a central server system can learn what systematic errors are made by the deployed global model. An improved global model could be trained taking into account the collected local models.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations are set forth in the accompanying drawings and the description below. Other potential features and advantages will become apparent from the description, the drawings, and the claims.

DETAILED DESCRIPTION

Figure 1A:
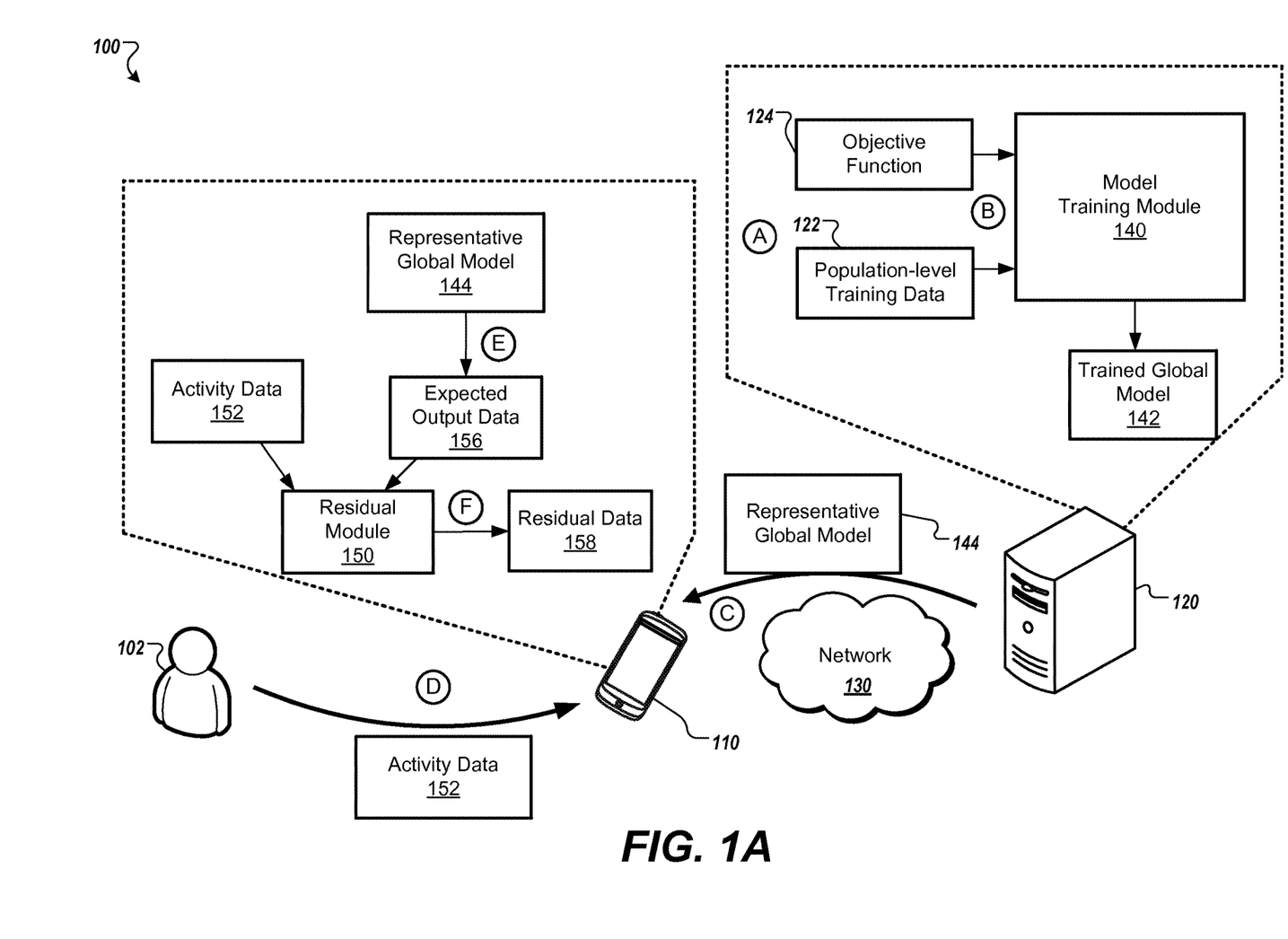
FIG. 1A is a block diagram of an example system.

FIG. 1A is a block diagram of an example system 100. The system 100 can be used evaluate a global model to determine an expected observation for a user activity. The system 100 can also be used to determine residual data based on a comparison between the expected observation and an actual observation. A global model refers to a model trained using population-level data from a collection of users operating one or more respective computing devices. The global model may be transmitted to, and evaluated locally on, a particular computing device for a particular user. A comparison between the expected observation predicted by the global model and the actual observation of the user provides the residual data that may represent a unique characteristic of the user.

The system 100 includes a client device 110, a computing system 120, and a network 130. In general, the computing system 120 may be a remote server system that provides a representative global model 144 based on a trained global model 142 to the client device 110. The computing system 120 includes a model training module 140 for deriving a trained global model 142 to provide a population-level baseline for one or more activities or behaviors associated with a group of training users. The functions performed by the computing system 120 can be performed by individual computer systems or can be distributed across multiple computer systems.

In the system 100, the client device 110 can be, for example, a desktop computer, laptop computer, a tablet computer, a wearable computer, a cellular phone, a smart phone, a music player, an e-book reader, a navigation system, or any other appropriate computing device. In some implementations, the client device 110 may include one or more sensors for measuring one or more characteristics of a user of the client device 110. For example, the client device 110 may include an accelerometer, a GPS receiver, a gyroscope, a magnetometer, a microphone, a touch panel, a camera, a user operation (e.g., keyboard, application usage, etc.), or any other appropriate sensors. In some implementations, an observation of an activity of a user includes a combination of one or more measured characteristics from the user during the activity. In some implementations, an observation may include a combination of one or more measured characteristics, as processed by one or more software modules or engines. Examples of an activity include walking, running, driving, texting, talking on the phone, recording photographs, recording videos, or any other activities that the client device 110 may measure.

In some implementations, a client device 110, e.g., a phone of a user, may receive a representative global model 144 from the computing system 120, where the representative global model 144 may be a compressed or simplified version of the trained global model 142. The client device 110 includes a residual module 150 for determining residual data 158. The client device 110 may store the representative global model 144, and locally evaluate the representative global model 144 and to determine the residual data 158 without communicating with a remote server system (e.g., the computing system 120). As a result, the specific observations of the user 102 can be withheld from the remote server system. Moreover, as described in more detail below with reference to FIG. 1B, the residual data 158 may be used to train a local model for the user 102 to provide a more accurate representation of the user 102.

The network 130 can be wired or wireless or a combination of both. The network 130 can include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination of networks.

FIG. 1A also illustrates an example flow of data, shown in stages (A) to (F). Stages (A) to (F) may occur in the illustrated sequence, or they may occur in a suitable sequence that is different than in the illustrated sequence. In some implementations, one or more of the stages (A) to (F) may occur offline, where the computing system 120 or the client device 110 may perform computations when the client device 110 is not connected to the network 130.

During stage (A), the computing system 120 obtains a collection of population-level training data 122, and inputs the population-level training data 122 to a model training module 140. In general, the population-level training data 122 represents multiple observations collected by multiple client devices, where the observations are associated with one or more activities performed by each of a collection of users. In some implementations, the population-level training data 122 may be stored and accessible by the computing system 120. For example, a client device may include one or more sensors for measuring an orientation, a location, a motion, a velocity, a typing pattern, phone usage, or other measurable parameters by the client device. These measurements may be correlated with an activity performed by a user of the client device to generate an observation for the activity. The observations from multiple client devices may be aggregated to form the collection of population-level training data 122. In some implementations, the population-level training data 122 may include a single observation performed by a user. In some other implementations, the population-level training data 122 may include multiple observations performed by the same user.

In some implementation, the population-level training data 122 may include a specific type of measured data associated with an activity. In some other implementations, the population-level training data 122 may include multiple types of measured data associated with an activity. In some implementations, the population-level training data 122 may include data representing demographics of the collection of users. For example, the computing system 120 may select training data based on gender of the users for the population-level training data 122. In some implementations, the population-level training data 122 may be anonymous.

In some implementations, the population-level training data 122 may be normalized to a specified format. For example, training data collected from client devices manufactured by different manufacturers may be normalized to a standard format before aggregating into population-level training data 122. As another example, training data collected from client devices running different operating systems may be normalized to a standard format before aggregating into population-level training data 122. In some implementations, multiple types of measured data may be normalized to a specific format. For example, multiple types of measured data associated with a specific activity for a user may be represented by a single vector. In some implementations, one or more weights may be assigned to one or more of the multiple types of measured data.

During stage (B), a model training module 140 of the computing system 120 uses the population-level training data 122 to train a global model, resulting in a trained global model 142. For example, the model training module 140 may train a global model based on principal component analysis (PCA). As another example, a non-time-series global model may be trained based on stochastic gradient descent. Descriptions of an example non-time-series model can be found in "Wsabie: Scaling Up To Large Vocabulary Image Annotation" by Weston, et. al., Proceedings of the International Joint Conference on Artificial Intelligence, IJCAI (2011). As another example, a time-series global model such as a recurrent neural network may be trained using vector-valued population-level training data. Descriptions of an example time-series model can be found in "Generating sequences with recurrent neural networks" by Graves, et. al., CoRR abs/1308.0850. In some implementations, the global model is trained based on population-level training data 122 associated with a specific activity. In some other implementations, the global model is trained based on population-level training data 122 associated with multiple activities.

During training, one or more objective functions 124 may be provided as input to the model training module 140. In some implementations, an objective function 124 may be target vectors specified as the desired outputs that the trained global model should produce after training. The objective function 124 may specify a threshold for optimizing the trained global model 142. For example, the objective function 124 may specify a minimum signal-to-noise ratio of the signal and noise variances for deriving the global model based on PCA. The objective function 124 may provide one or more conditions for categorizing the population-level training data 122 in the trained global model 142. For example, the objective function 124 may specify first conditions for characterizing that the user is walking and may specify second conditions for characterizing that the user is running.

The model that satisfies the one or more objective functions 124 may be designated as the trained global model 142. In some implementations, the parameters of the model training module 140 are adjusted automatically by the computing system 120. In some other implementations, the parameters of the model training module 140 are adjusted manually by an operator of the computing system 120.

During stage (C), once the global model has been trained, a representative global model 144 based on the trained global model 142 is transmitted from the computing system 120 to the client device 110 through the network 130. In some implementations, the representative global model 144 may be a compressed or simplified version of the trained global model 142, so that the representative global model 144 may include a portion of, or subset of, the trained global model 142. For example, if the trained global model 142 is trained under PCA as a vector space with m orthogonal axes, the representative global model 144 may include a vector space with (m−1) orthogonal axes, where m is an integer greater than one.

During stage (D), a user 102 operating the client device 110 provides activity data 152 to the client device 110. The activity data 152 may be data measured by one or more sensors on the client device 110 while the user 102 is performing the specific activity. In some implementations, the activity data 152 includes a specific type of measured data associated with an activity. In some other implementations, the activity data 152 includes multiple types of measured data associated with an activity. The client device 110 may verify with the user 102 to confirm that the user 102 has performed a specific activity. In some implementations, the client device 110 stores the activity data 152.

The activity data 152 may include data measured over a single observation. Alternatively, the activity data 152 may include data measured over multiple observations. For example, the user 102 may jog with the client device 110 for a period of time over several days. The activity data 152 may include data measured during one run over one single day, or data measured during multiple runs over multiple days.

The client device 110 may normalize the activity data 152 to a specific format. Additionally, one or more weights can be assigned to one or more measurements of the activity data 152.

During stage (E), the client device 110 evaluates the representative global model 144 to determine expected output data 156. In general, the expected output data 156 represents a prediction of characteristics associated with an activity performed by the user 102. In some implementations, the expected output data 156 may be a vector. For example, the representative global model 144 may be a model with a reduced-dimension vector space having (m−1) principal axes based on PCA, where data along each principal axis is Gaussian-distributed. The representative global model 144 may determine an averaged vector in the reduced-dimension vector space, and then project the averaged vector back to the original vector space with m orthogonal axes. The expected output data 156 may be the projected vector in the original vector space.

In some implementations, the client device 110 may input profile data of the user 102 to the representative global model 144 to determine expected output data 156. For example, the client device 110 may input the age of the user 102 to the representative global model 144 to determine expected output data 156 for the age group of the user 102. This determination is performed locally on the client device 110, and therefore the user's profile is not transmitted to the computing system 120.

During stage (F), the residual module 150 of the client device 110 compares the activity data 152 and the expected output data 156 from the representative global model 144, and determines residual data 158. In general, the residual data 158 represents a characteristic signature of the user 102. In some implementations, the residual module 150 determines the residual data 158 by determining a difference between the activity data 152 and the expected output data 156. For example, the residual module 150 may determine the residual data 158 by determining a vector distance between a first vector representing the activity data 152 and a second vector representing the expected output data 156.

Figure 1B:
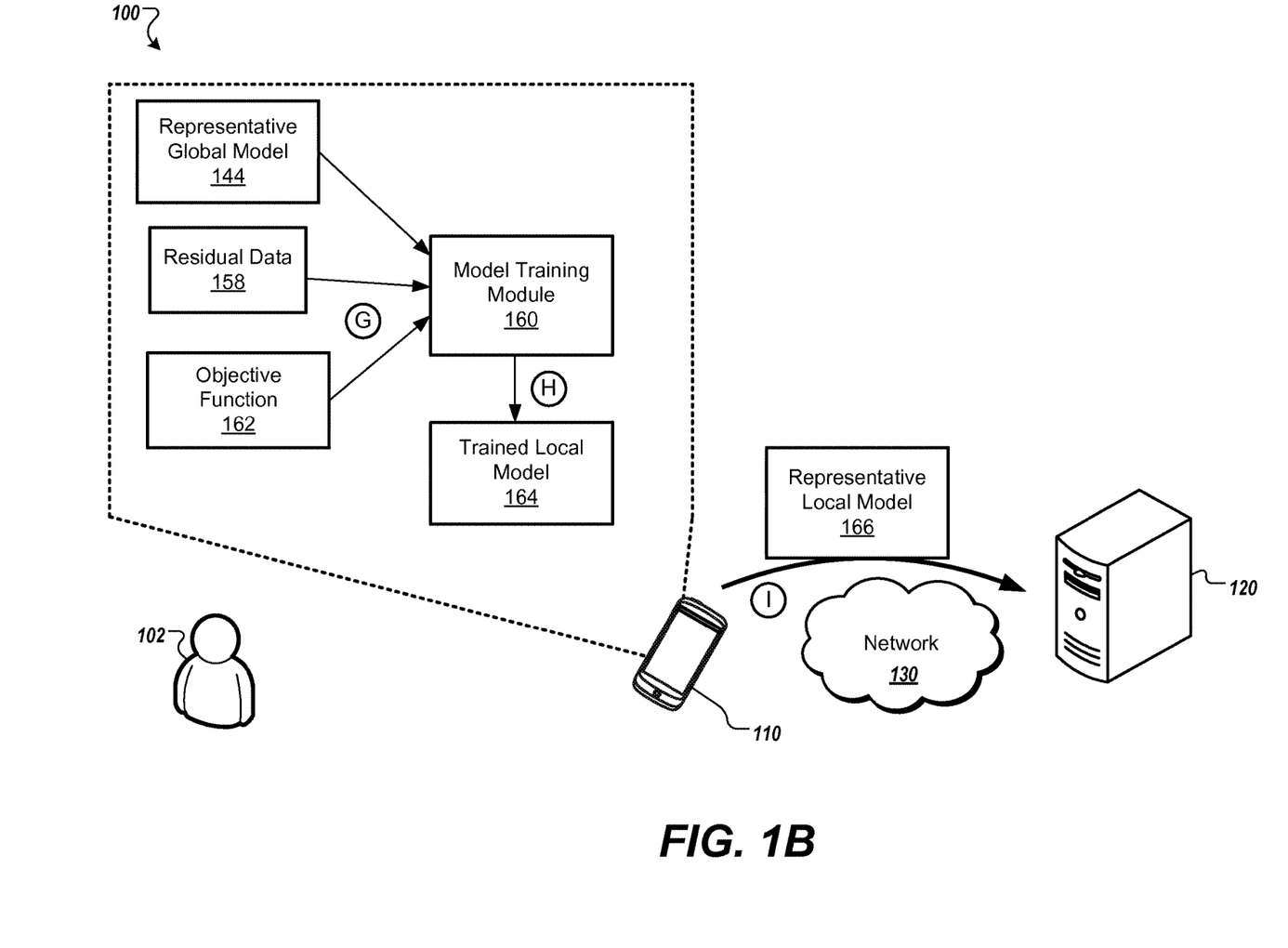
FIG. 1B is a block diagram of an example system that can use residual data to train a local model for the user.

FIG. 1B is a block diagram of the example system 100 that can use the residual data to train a local model for the user 102. In general, a model (e.g., a global model or a local model) may refer to any representational model f(x) that is invertible, where given the representation output by f(x), a maximum likelihood pseudo-observation $f^{-1}(f(x))$ may be found. For example, a local model may be trained to predict the vector valued $f^{-1}(f(x))-x$. In some implementations, a model may refer to a representational model f(x) that is not invertible, but an inference function g may be applied to the representation output by f(x) to estimate a pseudo-observation g(f(x)). For example, a global model or a local model may be a neural network with multiple hidden layers such that it may be challenging to invert the output, but an inference function may be applied to the output to estimate the input observation.

In general, the client device 110 includes a model training module 160 configured to train a local model that represents the user 102 more accurately than the representative global model 144. The local model may be transmitted to the computing system 120 as a representation of the user 102 without disclosing actual data measured during the observations. Advantageously, the privacy of the user 102 is protected because the actual observations are stored locally in the client device 110 and not transmitted to the computing system 120. In some implementations, the user 102 may control the disclosure of the actual observations to the computing system 120.

FIG. 1B also illustrates an example flow of data, shown in stages (G) to (I). Stages (G) to (I) may occur in the illustrated sequence, or they may occur in a suitable sequence that is different than in the illustrated sequence. In some implementations, one or more of the stages (G) to (I) may occur offline, where the computing system 120 or the client device 110 may perform computations when the client device 110 is not connected to the network 130.

During stage (G), the client device 110 inputs the residual data 158, the representative global model 144, and one or more objective functions 162 to a model training module 160. During stage (H), the model training module 160 determines a trained local model 164 for the user 102. In some implementations, the training process for the local model is similar to the training process for the global model. For example, using PCA, the model training module 160 may use the residual data 158 to determine updated principal axes of the representative global model 144 that minimize the signal-to-noise ratio of the signal and noise variances from the actual observations. In some implementations, the training process for the local model may use a different model class. For example, the model training module 160 may use the residual data 158 to determine a local model associated with a different activity.

The training process may occur when the user 102 is not operating the client device 110. Alternatively, or additionally, the training process may occur when the client device 110 is connected to a power outlet. In some implementations, the client device 110 performs the training process in a batch, where multiple local models may be trained for different activities. In some implementations, the client device 110 performs the training process immediately upon receiving the residual data 158. In some implementations, the client device 110 performs the training process periodically.

In some implementations, the model training module 160 updates the trained local model 164 over time. For example, if the user 102 takes a run each day, the residual module 150 may compare data representing the actual observations for these runs with expected output data determined by the current trained local model 164. The residual module 150 may determine updated residual data, where the model training module 160 may determine an updated local model accordingly. This process allows the client device 110 to capture postural or other changes that the user 102 may be experiencing over time.

During stage (I), the client device 110 transmits a representative local model 166 to the computing system 120. In some implementations, the representative local model 166 is different from the trained local model 164. For example, the representative local model 166 may be a compressed version of the trained local model 164. As another example, the client device 110 may remove private information about the user 102 from the trained local model 164 to generate the representative local model 166.

Although not illustrated in FIG. 1B, in some implementations, the local model is trained by the computing system 120. For example, the client device 110 may transmit residual data 158 to the computing system 120, where the computing system 120 may use the residual data 158 as training data or an objective function in training an updated model to represent the user 102.

Figure 1C:
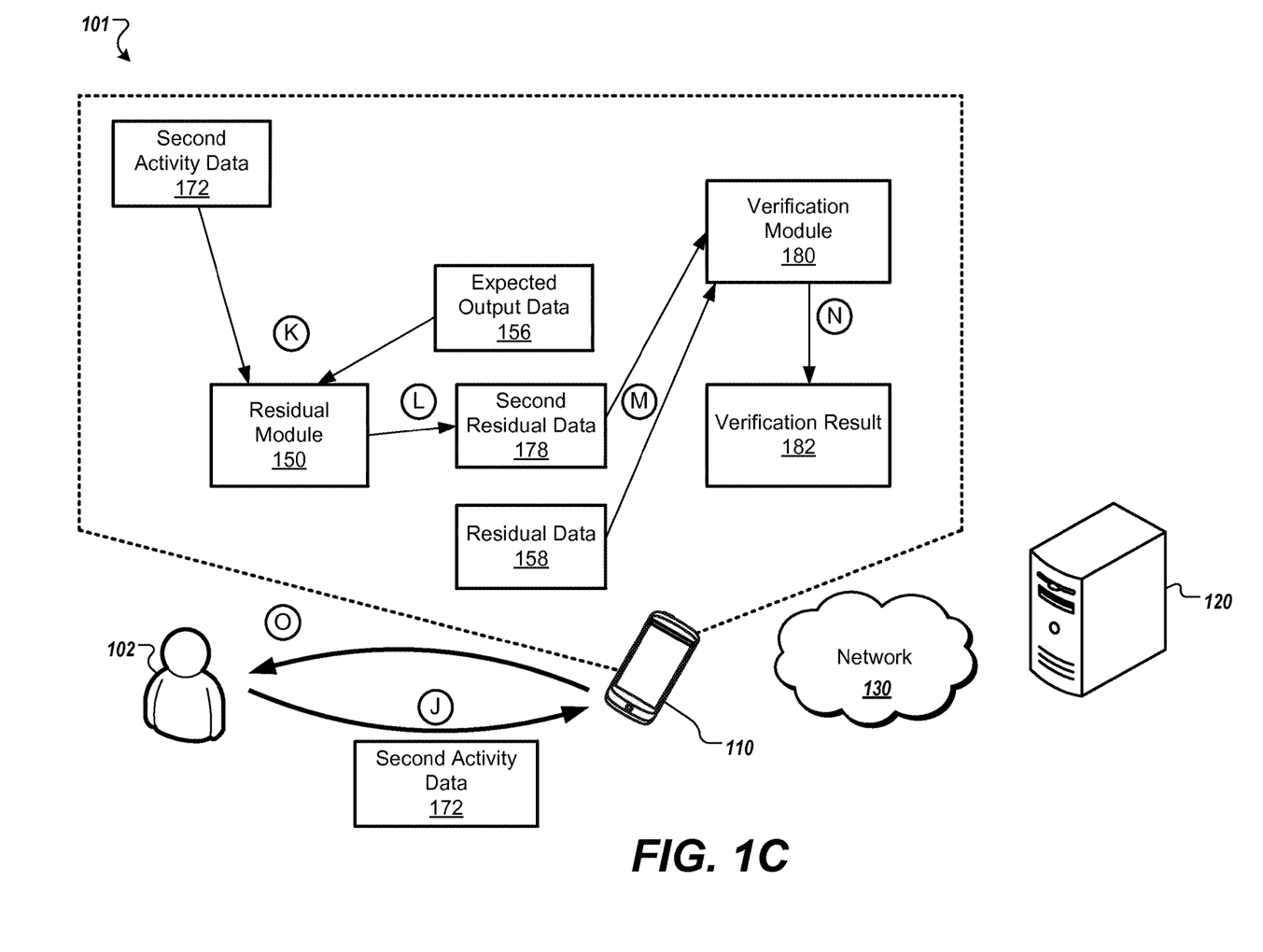
FIG. 1C is a block diagram of an example system that can use the residual data to authenticate the identity of the user.

FIG. 1C is a block diagram of an example system 101 that can use the residual data to authenticate an identity of the user. In general, after the residual data 158 has been determined by the client device 110, the client device 110 may compare new residual data generated at later times with the residual data 158 to verify the identity of the user 102. The client device 110 includes a verification module 170 configured to verify the identity of the user 102 based on the quirk of the user 102.

FIG. 1C also illustrates an example flow of data, shown in stages (J) to (O). Stages (J) to (O) may occur in the illustrated sequence, or they may occur in a suitable sequence that is different than in the illustrated sequence. In some implementations, one or more of the stages (J) to (O) may occur offline, where the client device 110 may perform computations when the client device 110 is not connected to the network 130.

During stage (J), the user 102 performs the activity and the client device 110 measures and collects second activity data 172. For example, while walking, the user 102 may hold the client device 110 at a specific orientation. The client device 110 may measure the orientation of the client device 110 continuously or periodically. As another example, while running, the user 102 may move at a specific range of speed. The client device 110 may measure the movement of the client device 110 continuously or periodically. As another example, while speaking on the client device 110, the user 102 may talk with one or more speech features. The client device 110 may measure the user's utterance and analyze the speech features continuously or periodically. During stage (K), the second activity 172 and the expected output data 156 are used as input to the residual module 150. During stage (L), the residual module 150 determines second residual data 178

During stage (M), the residual data 158 and the second residual data 178 are used as input to the verification module 180. During stage (N), the verification module 180 determines whether the second residual data 178 substantially matches the residual data 158 of the user 102. In some implementations, the second residual data 178 substantially matches the residual data 158 if the difference between the second residual data 178 and the residual data 158 satisfies a threshold condition. The verification module 180 may output a verification result 182.

During stage (O), the client device 110 may provide an indication that represents a verification result 182 to the user 102. In some implementations, if the client device 110 has accepted the identity of the user 102, the client device 110 may send the user 102 a visual or audio indication that the verification is successful. In some other implementations, if the client device 110 has accepted the identity of the user 102, the client device 110 may continue its operations without presenting the verification result 182 to the user 102.

If the client device 110 has rejected the identity of the user 102, the client device 110 may send the user 102 a visual or audio indication that the verification is rejected. In some implementations, if the client device 110 has rejected the identity of the user 102, the client device 110 prompts the user 102 for another way of verifying the identity of the user 102. If the number of attempts exceeds a threshold, the client device 110 may disallow the user 102 from further attempting to verify the user's identity.

Figure 2:
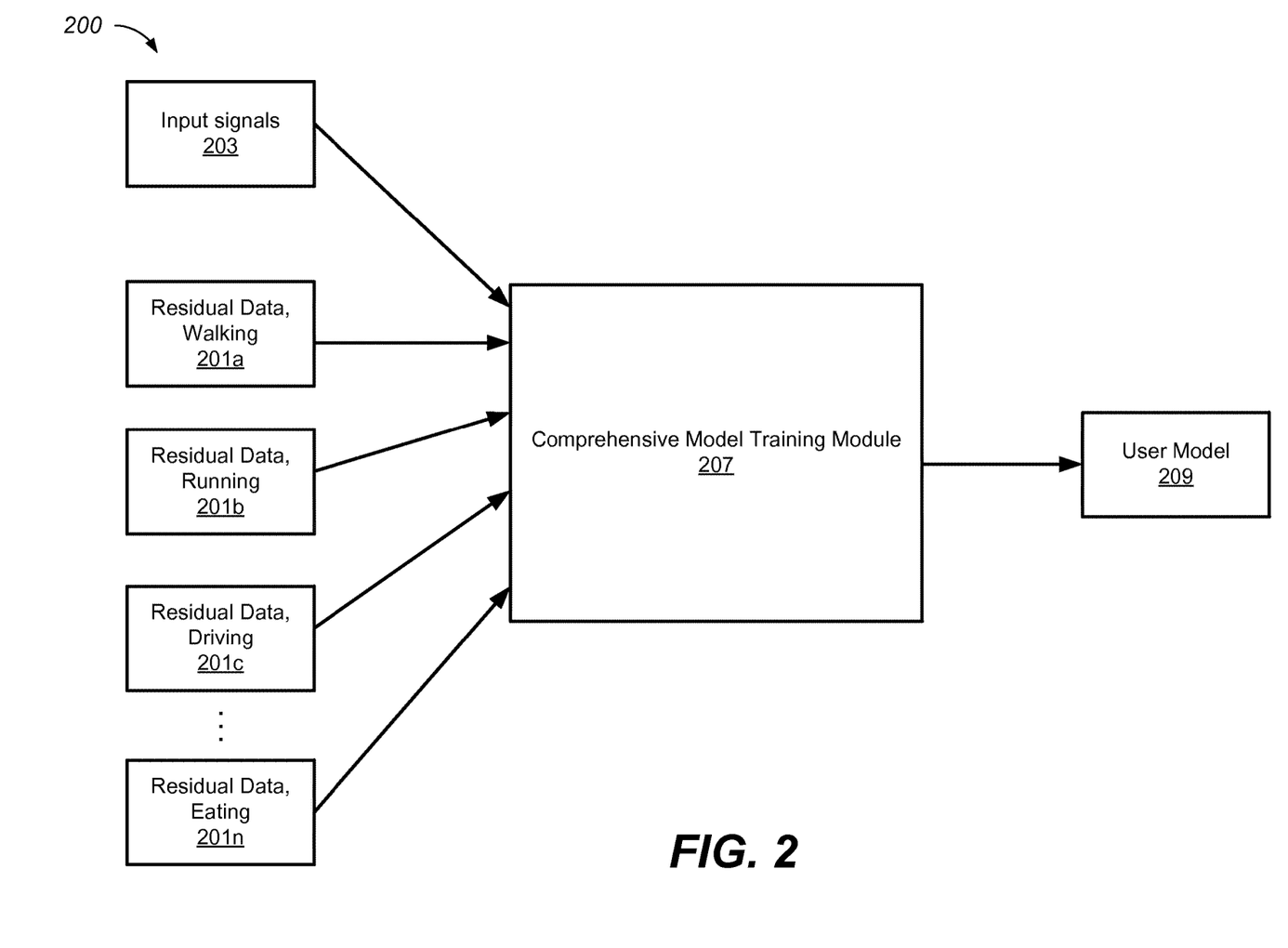
FIG. 2 is a block diagram of an example system that can use residual data of multiple activities to train a local model for the user.

FIG. 2 is a block diagram of an example system 200 that uses residual data of multiple activities to train a local model for the user. In general, the computing system 120 may train a respective global model for each activity. Once the client system 110 determines the quirks, or the residual data, associated with each activity, a comprehensive user model may be trained to represent a comprehensive profile of the user. For example, the client device 110 may use the comprehensive user model to classify various activities being performed by the user. As another example, if multiple comprehensive user models have been stored in the client device 110, the client device 110 may identify a specific user among multiple potential users by the quirks of the specific user.

The system 200 includes a comprehensive model training module 207 configured to receive multiple residual data 201a-201n as input, and determine a user model 209 as output. In some implementations, the user model 209 may be trained on a client device e.g., the client device 110 of FIG. 1B. In some other implementations, the user model 209 may be trained on a computing system e.g., the computing system 120 of FIG. 1A.

In some implementations, the comprehensive model training module 207 receives one or more additional input signals 203 as input. The input signals 203 may include one or more of data, models, objective functions, or other signals that the comprehensive model training module 207 may use to generate the user model 209. For example, the input signals 203 may include expected output data for one or more activities. As another example, the input signals 203 may include the actual observations for one or more activities. As another example, the input signals 203 may include one or more global models and/or one or more local models for one or more activities.

In some implementations, the comprehensive model training module 207 updates the user model 209 over time. For example, the comprehensive model training module 207 may update the user model 209 periodically. Alternatively in another example, the comprehensive model training module 207 may update the user model 209 in response to residual data for one or more activities being updated.

Figure 3:
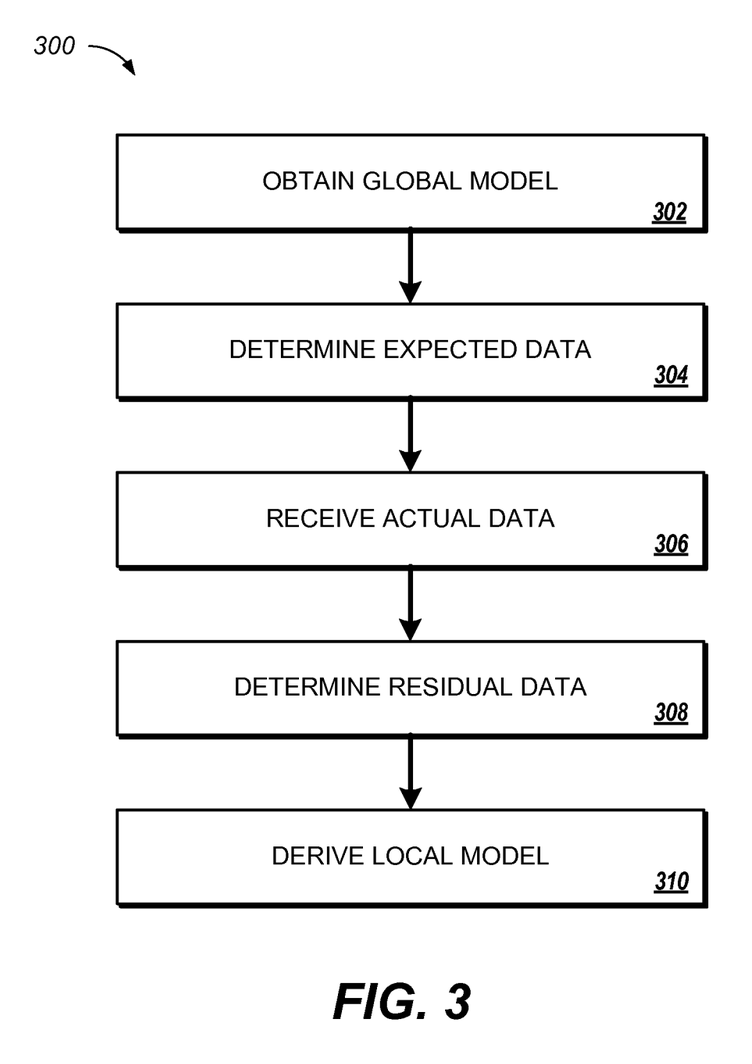
FIG. 3 is a flow chart illustrating an example process for deriving a local model.

FIG. 3 is a flow diagram that illustrates an example process 300 for deriving a local model. The process 300 may be performed by data processing apparatus, such as the client device 110 described above. Alternatively or additionally, the process 300 may be performed by the computing system 120 or another data processing apparatus.

The system obtains a global model for a particular activity (302). In some implementations, the global model may be derived based on input data representing multiple observations associated with the particular activity performed by a collection of users. For example, the client device 110 may receive a representative global model 144 from the computing system 120.

The system determines, using the global model, expected data that represent an expected observation associated with the particular activity performed by a particular user (304). For example, the client device 110 may use the representative global model 144 to determine expected output data 156.

The system receives particular data representing an actual observation associated with the particular activity performed by the particular user (306). For example, the client device 110 may receive the activity data 152 from the user 102.

The system determines residual data using (i) the expected data and (ii) the particular data (308). For example, the residual module 150 may determine the residual data 158 based on the activity data 152 and the expected output data 156.

In some implementations, the system determines the residual data based on a difference between the expected data and the particular data. For example, if the expected output data 156 and the activity data 152 are vectors of equal dimensions, the residual module 150 may determine the residual data 158 based on a difference between the two vectors.

In some implementations, the system receives second particular data associated with the particular activity. For example, the client device 110 may receive the second activity data 172 from the user 102. The system may determine second residual data using (i) the expected data and (ii) the second particular data. For example, the residual module 150 may determine second residual data 178 based on the second activity data 172 and the expected output data 156. The system may determine that the second residual data does not substantially match the residual data. For example, the verification module 180 may determine that the second residual data 178 does not substantially match the residual data 158. In some implementations, the second residual data 178 does not substantially match the residual data 158 if a difference between the second residual data 178 and the residual data 158 does not satisfy a threshold. In response to determining that the second residual data does not substantially match the residual data, the system may determine that an identity of the particular user is not verified. For example, the verification module 180 may output the verification result 182, and notify the user that the identity of the user 102 is not verified.

The system derives a local model of the particular user based on the residual data (310). In some implementations, the local model may be derived by a computing device. For example, the model training module 160 of the client device 110 may derive the local model 164. The computing device may transmit the local model of the particular user to one or more remote computers as a representation of the particular user. For example, the client device 110 may transmit the representative local model 166 to the computing system 120.

In some implementations, the computing device may transmit the residual data to one or more remote computers, where the local model may be derived by the one or more remote computers. For example, the client device 110 may transmit the residual data 158 to the computing system 120, where the model training module 140 of the computing system 120 may derive a local model for the user 102.

In some implementations, the system determines, using the local model, particular expected data representing an expected observation associated with the particular activity performed by the particular user, where the particular expected data determined by the local model substantially matches the particular data. For example, the client device 110 may use the trained local model 164 to generate expected output data associated with an activity, where the expected output data substantially matches the activity data 152. The particular expected data may be determined as substantially matching the particular data if a difference between the particular expected data and the particular data satisfies a threshold.

In some implementations, the system obtains a second global model for a second activity that is different from the particular activity. The second global model may be derived based on second input data representing multiple observations associated with the second activity performed by multiple users. The system may determine, using the second global model, second expected data representing an expected observation associated with the second activity performed by a user. The system may receive, by a computing device operated by the particular user, second particular data representing an actual observation associated with the second activity performed by the particular user. The system may determine, by the computing device and using (i) the second expected data and (ii) the second particular data, second residual data of the particular user.

In some implementations, the system may derive the local model of the particular user based at least on (i) the residual data and (ii) the second residual data. For example, the comprehensive model training module 207 may derive the user model 209 based on residual data 201a-n.

Figure 4:
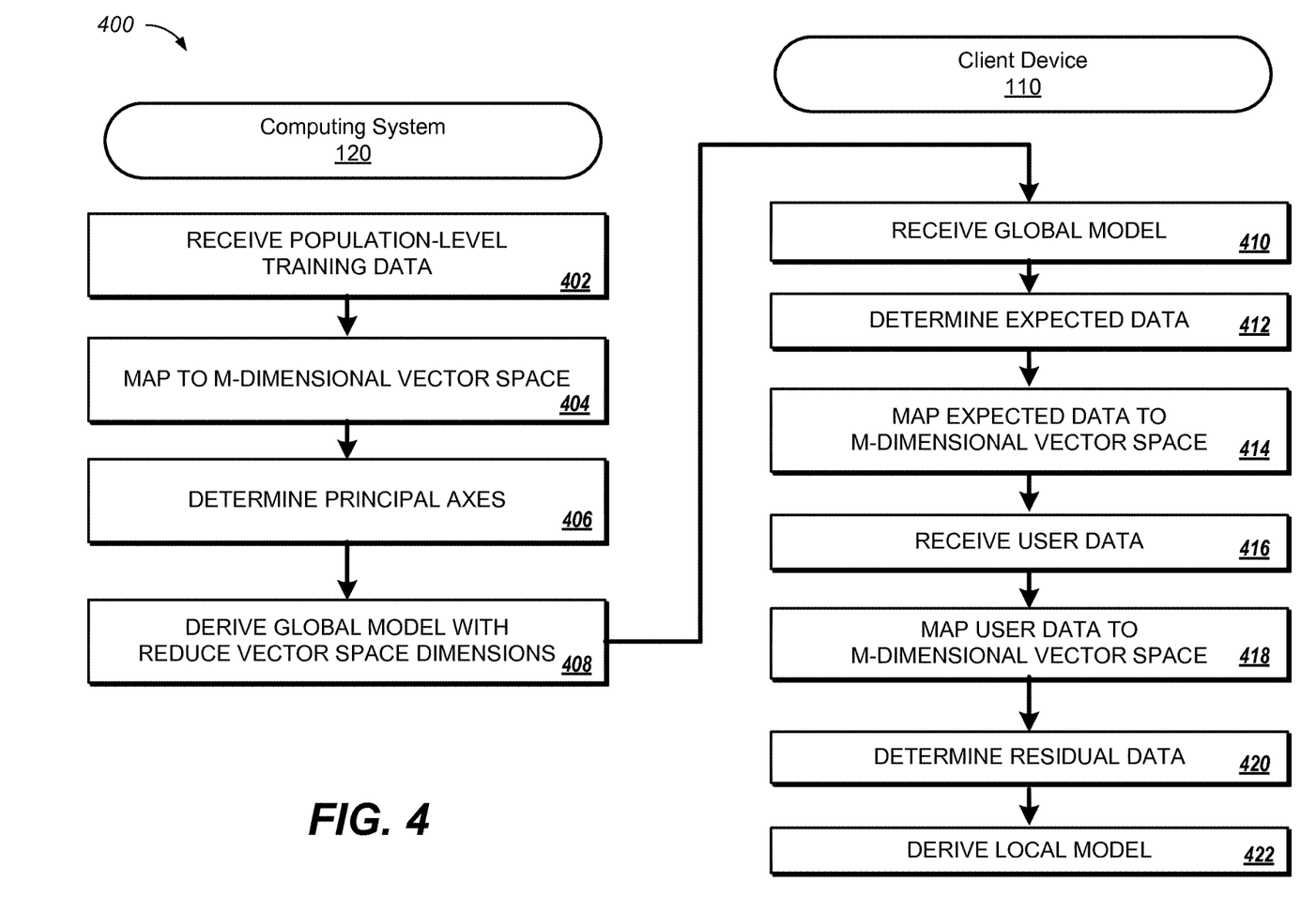
FIG. 4 is a flow chart illustrating an example process for deriving a local model based on principal component analysis.

FIG. 4 is a flow diagram that illustrates an example process 400 for deriving a local model based on principal component analysis. The process 400 may be performed by data processing apparatus, such as the system 100 described above or another data processing apparatus.

The computing system 120 receives population-level training data (402). For example, for all the training users that have performed a specific activity, the respective client devices may have provided the computing system 120 with a total of n observations, where n is an integer equal to or greater than one. Each observation may include m types of measurements, where m is an integer equal to or greater than one. The population-level training data may be constructed as an m-by-n matrix.

The computing system 120 maps the population-level training data to m-dimensional vector space, where m may be an integer greater than or equal to one (404). For example, by assigning each of the m types of measurements as a dimension, each of the n observations can be assigned to a vector with size m. The computing system 120 may map the n vectors to a vector space with m orthogonal axes.

The computing system 120 determines one or more principal axes based on the mapped population-level training data (406). For example, using principal component analysis, the computing system 120 can find the eigenvectors of the covariance to determine the principal axes of the vector space.

The computing system 120 derives a global model with reduced vector space dimensions (408). For example, the computing system 120 may determine the variance along each of the principal axes. If the variance of a particular principal axis satisfies a threshold, the computing system 120 may determine that the data along the particular principal axis represent substantive data. If the variance of a particular principal axis does not satisfy a threshold, the computing system 120 may determine that the data along the particular principal axis represent noise, and the computing system 120 may remove the particular principal axis from the vector space to reduce the dimension of the vector space. For example, if the computing system 120 determines that one principal axis does not carry substantive data, the computing system 120 may generate a global model with a vector space having (m−1) principal axes. The n observations are mapped to the reduced vector space accordingly, where each vector has (m−1) elements.

The client device 110 receives the global model (410). For example, the client device 110 may receive the reduced vector space having (m−1) principal axes with n vectors as the global model.

The client device 110 determines expected data (412). For example, the client device may determine a mean vector using the n vectors in the reduced vector space. The mean vector has (m−1) elements.

The client device 110 re-maps the expected data to m-dimensional vector space (414). For example, the client device 110 may re-map the mean vector back into the original vector space having m orthogonal axes. The re-mapped mean vector represents an expected pseudo-observation for a user performing the activity.

The client device 110 receives user data (416). For example, the client device 110 may receive an observation including m types of measuring data from the user 102 while the user 102 is performing the activity. In some implementations, the client device 110 may receive k observations from the user 102, where k is an integer equal to or greater than one.

The client device 110 maps user data to the m-dimensional vector space (418). For example, the client device 110 may map the actual observations to the original vector space.

The client device 110 determines residual data (420). For example, the client device 110 may determine a vector distance between the mapped actual observations, and the re-mapped mean vector as the residual data.

The client device 110 derives the local model (422). For example, the client device 110 may use the vector distance as a training target in deriving the local model for the user 102.

A number of implementations have been described. Nevertheless, it will be understood that various modifications may be made without departing from the spirit and scope of the disclosure. For example, various forms of the flows shown above may be used, with steps re-ordered, added, or removed.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A computer-implemented method, comprising:
obtaining, at a client computing device associated with a particular user, a global model for a particular activity, the global model derived at a computer system based on input data representing multiple observations associated with the particular activity performed by each of a collection of users, wherein the received global model comprises a reduced vector space having m−1 principal axes with n vectors, where m and n are integers equal to or greater than one;
determining, at the client computing device and using the global model, expected data representing an expected observation associated with the particular activity performed by a particular user, wherein determining expected data comprises determining a mean vector using the n vectors of the reduced vector space, wherein the mean vector has m−1 elements;
remapping, at the client computing device, the mean vector representing the expected data to an m-dimensional vector space, wherein the re-mapped mean vector represents an expected pseudo-observation for the particular user performing the particular activity;

receiving, by the client computing device, particular activity data representing an actual observation associated with the particular activity performed by the particular user measured by one or more sensors of the client computing device, wherein the observation includes m types of measuring data, and wherein the client computing device maps the particular activity data to the m-dimensional vector space;

determining, by the client computing device, residual data of the particular user, wherein determining the residual data comprises comparing (i) the expected data for the specific user generated by the global model and (ii) the particular activity data representing the actual observation, and wherein determining the residual data further comprises determining a vector distance between the mapped particular activity data and the re-mapped mean vector for the user;

deriving, at the client computing device, a distinct local model specific to the particular user at the client computing device using the residual data, the global model, and one or more objective functions, wherein deriving the local model comprises using the vector distance as a training target, and wherein the local model provides a representation of the particular user with respect to the particular activity;

transmitting, from the client computing device, the local model of the particular user to one or more server computers as a representation of the particular user without providing the particular activity data representing the actual observation associated with the particular activity performed by the particular user and used to derive the local model; and using the local model to generate expected output data associated with the particular activity for the particular user.

2. The method of claim 1, comprising:
determining, using the local model, particular expected data representing an expected observation associated with the particular activity performed by the particular user, wherein the particular expected data determined by the local model substantially matches the particular data.

3. The method of claim 1, wherein the global model includes a first vector space constructed by first multiple principal axes, and wherein the local model includes a second vector space constructed by second multiple principal axes that are different from the first multiple principal axes.

4. The method of claim 1, comprising:
obtaining a second global model for a second activity that is different from the particular activity, the second global model derived based on second input data representing multiple observations associated with the second activity performed by a collection of users;

determining, using the second global model, second expected data representing an expected observation associated with the second activity performed by the particular user;

receiving, by the computing device operated by the particular user, second particular data representing an actual observation associated with the second activity performed by the particular user; and determining, by the computing device and using (i) the second expected data and (ii) the second particular data, second residual data of the particular user.

5. The method of claim 4, wherein deriving the local model of the particular user comprises deriving the local model of the particular user based at least on (i) the residual data and (ii) the second residual data.

6. The method of claim 4, wherein the residual data and the second residual data is used to train a comprehensive user model that provides a representation of the particular user with respect to the particular activity and the second activity.

7. The method of claim 1, comprising:
receiving second particular data associated with the particular activity at a second time after determining the residual data from the particular data;

determining, by the computing device and using (i) the expected data and (ii) the second particular data, second residual data;

determining that the second residual data does not substantially match the previously determined residual data; and in response to determining that the second residual data does not substantially match the residual data, determining that an identity of the particular user is not verified.

8. A non-transitory computer-readable medium storing software having stored thereon instructions, which, when executed by one or more computers, cause the one or more computers to perform operations of:

obtaining, at a client computing device associated with a particular user, a global model for a particular activity, the global model derived at a computer system based on input data representing multiple observations associated with the particular activity performed by each of a collection of users, wherein the received global model comprises a reduced vector space having m−1 principal axes with n vectors, where m and n are integers equal to or greater than one;

determining, at the client computing device and using the global model, expected data representing an expected observation associated with the particular activity performed by a particular user, wherein determining expected data comprises determining a mean vector using the n vectors of the reduced vector space, wherein the mean vector has m−1 elements;

remapping, at the client computing device, the mean vector representing the expected data to an m-dimensional vector space, wherein the re-mapped mean vector represents an expected pseudo-observation for the particular user performing the particular activity;

receiving particular activity data representing an actual observation associated with the particular activity performed by the particular user measured by one or more sensors of the client computing device, wherein the observation includes m types of measuring data, and wherein the client computing device maps the particular activity data to the m-dimensional vector space;

determining residual data of the particular user, wherein determining the residual data comprises comparing (i) the expected data for the specific user generated by the global model and (ii) the particular activity data representing the actual observation, and wherein determining the residual data further comprises determining a vector distance between the mapped particular activity data and the re-mapped mean vector for the user;

deriving, and the client computing device, a distinct local model specific to the particular user at the client computing device using the residual data, the global model, and one or more objective functions, wherein deriving the local model comprises using the vector distance as a training target, and wherein the local model provides a representation of the particular user with respect to the particular activity;

transmitting, from the client computing device, the local model of the particular user to one or more server computers as a representation of the particular user without providing the particular activity data representing the actual observation associated with the particular activity performed by the particular user and used to derive the local model; and using the local model to generate expected output data associated with the particular activity for the particular user.

9. The non-transitory computer-readable medium of claim 8, wherein the operations comprise:

determining, using the local model, particular expected data representing an expected observation associated with the particular activity performed by the particular user, wherein the particular expected data determined by the local model substantially matches the particular data.

10. The non-transitory computer-readable medium of claim 8, wherein the global model includes a first vector space constructed by first multiple principal axes, and wherein the local model includes a second vector space constructed by second multiple principal axes that are different from the first multiple principal axes.

11. The non-transitory computer-readable medium of claim 8, wherein the operations comprise:

obtaining a second global model for a second activity that is different from the particular activity, the second global model derived based on second input data representing multiple observations associated with the second activity performed by a collection of users;

determining, using the second global model, second expected data representing an expected observation associated with the second activity performed by the particular user;

receiving second particular data representing an actual observation associated with the second activity performed by the particular user; and determining, using (i) the second expected data and (ii) the second particular data, second residual data of the particular user.

12. The non-transitory computer-readable medium of claim 8, wherein the operations comprise:

receiving second particular data associated with the particular activity;

determining, by the computing device and using (i) the expected data and (ii) the second particular data, second residual data;

determining that the second residual data does not substantially match the residual data; and in response to determining that the second residual data does not substantially match the residual data, determining that an identity of the particular user is not verified.

13. A system comprising:

a client computing device having one or more processors and one or more computer storage media storing instructions that are operable, when executed by the one or more processors, to cause the one or more processors to perform operations comprising:

obtaining, at the client device associated with a particular user, a global model for a particular activity, the global model derived at a computer system based on input data representing multiple observations associated with the particular activity performed by each of a collection of users, wherein the received global model comprises a reduced vector space having m−1 principal axes with n vectors, where m and n are integers equal to or greater than one;

determining, using the global model, expected data representing an expected observation associated with the particular activity performed by a particular user, wherein determining expected data comprises determining a mean vector using the n vectors of the reduced vector space, wherein the mean vector has m−1 elements;

remapping, at the client computing device, the mean vector representing the expected data to an m-dimensional vector space, wherein the re-mapped mean vector represents an expected pseudo-observation for the particular user performing the particular activity;

receiving particular activity data representing an actual observation associated with the particular activity performed by the particular user measured by one or more sensors of the client computing device, wherein the observation includes m types of measuring data, and wherein the client computing device maps the particular activity data to the m-dimensional vector space;

determining residual data of the particular user, wherein determining the residual data comprises comparing (i) the expected data for the specific user generated by the global model and (ii) the particular activity data representing the actual observation, and wherein determining the residual data further comprises determining a vector distance between the mapped particular activity data and the re-mapped mean vector for the user;

deriving a distinct local model specific to the particular user at the client computing device using the residual data, the global model, and one or more objective functions, wherein deriving the local model comprises using the vector distance as a training target, and wherein the local model provides a representation of the particular user with respect to the particular activity;

transmitting the local model of the particular user to one or more server computers as a representation of the particular user without providing the particular activity data representing the actual observation associated with the particular activity performed by the particular user and used to derive the local model; and using the local model to generate expected output data associated with the particular activity for the particular user.

14. The system of claim 13, wherein the operations comprise:

determining, using the local model, particular expected data representing an expected observation associated with the particular activity performed by the particular user, wherein the particular expected data determined by the local model substantially matches the particular data.

15. The system of claim 13, wherein the operations comprise:

obtaining a second global model for a second activity that is different from the particular activity, the second global model derived based on second input data representing multiple observations associated with the second activity performed by a collection of users;

determining, using the second global model, second expected data representing an expected observation associated with the second activity performed by the particular user;

receiving second particular data representing an actual observation associated with the second activity performed by the particular user; and determining, using (i) the second expected data and (ii) the second particular data, second residual data of the particular user.

16. The system of claim 13, wherein the operations comprise:

receiving second particular data associated with the particular activity;

determining, by the computing device and using (i) the expected data and (ii) the second particular data, second residual data;

determining that the second residual data does not substantially match the residual data; and in response to determining that the second residual data does not substantially match the residual data, determining that an identity of the particular user is not verified.

* * * * *